United States Patent [19]

Carter

[11] Patent Number: 4,761,066

[45] Date of Patent: Aug. 2, 1988

[54] STEREOSCOPIC OPTICAL SYSTEM

[76] Inventor: William J. Carter, 445 Natona St., San Francisco, Calif. 94103

[21] Appl. No.: 819,155

[22] Filed: Jan. 14, 1986

[51] Int. Cl.$^4$ .......................... G02B 23/00; G02B 5/08; G02B 5/10

[52] U.S. Cl. .................................. 350/510; 350/545; 350/619; 350/642

[58] Field of Search ............... 350/132, 510, 515, 516, 350/517, 542, 642, 545, 547, 619; 356/364, 365

[56] References Cited

U.S. PATENT DOCUMENTS

| 2,255,631 | 9/1941 | Schulman | 350/516 |
| 3,712,199 | 1/1973 | Songer, Jr. | |
| 3,827,793 | 8/1974 | Dudley | 350/132 |
| 4,059,336 | 11/1977 | Hopkins | 350/515 |
| 4,196,966 | 4/1980 | Malis | 350/145 |
| 4,392,710 | 7/1983 | Rogers | 350/545 |
| 4,601,552 | 7/1986 | Jessmore | 350/545 |

Primary Examiner—John K. Corbin
Assistant Examiner—Vincent J. Lemmo
Attorney, Agent, or Firm—Ciotti, Murashige, Irell & Manella

[57] ABSTRACT

An optical system for producing stereoscopic imaging of a subject. The system includes an objective lens for producing an image of the subject, and right and left ocular lenses for viewing the image through right and left eyes, respectively. A polarizing filter device positioned near the objective lens divides the image produced by the objective lens into left and right perspective components characterized by different polarization directions. Right and left polarizing filters positioned near the right and left ocular lenses allow these right and left perspective components to be viewed exclusively through the right and left ocular lenses, respectively. One embodiment of the invention is a high-power stereoscopic microscope. Another embodiment is a single-objective binocular telescope.

7 Claims, 3 Drawing Sheets

STEREOSCOPIC OPTICAL SYSTEM

FIELD OF THE INVENTION

The present invention relates to optical systems for viewing images stereoscopically.

BACKGROUND OF THE INVENTION

The usual light or UV binocular microscope contains a single objective lens which functions to produce a magnified image of the subject to be viewed, and dual ocular lenses for viewing the magnified image through right and left eyes. Since the image that is viewed through the oculars is formed by a single objective, the viewer has no perception of depth. As a consequence, it is often difficult to visualize how the magnified object appears in three dimensions, and this greatly limits the information available to the viewer, particularly when viewing specimens, such as external biological structures, in which the spatial arrangement of parts is unclear without depth references. Usually it is necessary to view such specimens through a series of focal planes in order to obtain depth information, a generally unsatisfactory approach, since the entire object cannot be viewed at one time. Also, the effort required to compensate for lack of three dimensional structure contributes to fatigue in normal microscope use.

Three-dimensional microscopes have been developed for and are widely used in microsurgery. These scopes are constructed somewhat like conventional binocular telescopes, in that they contain a pair of lens systems, each of which includes an objective lens and an ocular for viewing the magnified image produced by the associated objective. Thus the right and left sides of the subject under examination are viewed separately by right and left eyes, respectively, giving a three-dimensional image. One limitation of stereobinocular microscopes of this type is that the individual lens systems cannot be accurately focused on a single object region at a magnification much beyond about 40 power—a range that is normally adequate for microsurgical work, but not for general microscope applications. The surgical stereomicroscope is also relatively costly, since two separate lens systems are required and the device must be made with a high degree of precision.

Proposals have been made in the prior art for stereoscopic viewing at high magnification, but these have been rather complex mechanical systems that are not readily adaptable to a precision optical instrument. For example, microscopic systems having oscillating shutters which rapidly and recurrently switch between right and left oculars, giving a partial illusion of depth, have been proposed.

Stereoscopic binocular telescopes are, of course, well known and widely used. In general construction, binocular telescopes include separate left and right optical systems, each containing objective and ocular elements, for viewing a distant object simultaneously by left and right eyes. Binocular telescopes are quite satisfactory for intermediate telescope power, and are only limited in power by the size and cost of the individual optical systems. In this regard, it is noted that the monocular optical systems are doubled, and their mechanical perfection is critical to acceptable stereoscopic viewing.

SUMMARY OF THE INVENTION

It is therefore a general object of the invention to provide an optical system which largely overcomes above-mentioned problems and limitations associated with prior art microscopes and binocular telescopes.

One specific object of the invention is to provide a stereomicroscope which functions at high magnification, provides good depth of field, can be constructed by simple modification of a conventional high-power binocular microscope, and does not require oscillating mechanical or electronic elements.

Another specific object of the invention is to provide a stereoscopic binocular telescope which has a single objective, and which can therefore be made less expensively and with a larger objective than conventional binocular telescopes.

The optical system of the invention is designed for producing stereoscopic imaging of a subject. The system includes a single objective, which functions to produce an image of the object being viewed, and right and left ocular lenses for viewing the image through right and left eyes, respectively. An optical filter device positioned adjacent the objective divides the magnified image produced by the objective lens into left and right perspective components characterized by different polarization directions. Also included in the system are right and left filters positioned adjacent the right and left ocular lenses, respectively, which allow the perspective components to be viewed exclusively through the right and left ocular lenses, respectively. The filter device is preferably designed to produce perspective components characterized by mutually orthogonal linearly polarized light. The right and left ocular filters in this embodiment are polarizing filters with mutually orthogonal light-polarizing directions.

A stereomicroscope constructed according to the invention preferably includes an objective lens, a beam splitter which splits and directs the image rays from the objective lens toward the right and left oculars, and right and left ocular lenses. The filter device preferably includes a pair of side-by-side polarizing filters adjacent the plane of the objective lens. The ocular polarizing filters are preferably located between the beam splitter and the respective ocular lenses.

The binocular telescope of the invention has a single objective, which preferably includes a large-diameter aspheric reflector, or an elongate strip portion thereof, and a smaller-diameter reflector which reflects the image formed by the larger-diameter mirror to a beam splitter, for viewing by left and right ocular lenses. The reflector can be dimensioned to span the side-to-side distance across the binoculars, thus giving a greater focal distance and magnification than is possible with a pair of smaller lenses such as are employed in conventional binocular telescopes. The filter device may be located between the subject being viewed and the objective lens, or between the two mirrors in the objective lens, close to the larger-diameter mirror.

These and other objects and features of the invention will become more fully apparent when the following detailed description is read in conjunction with the accompanying drawings.

DETAILED DESCRIPTION OF THE INVENTION

A. Stereoscopic Microscope

Figure 3:
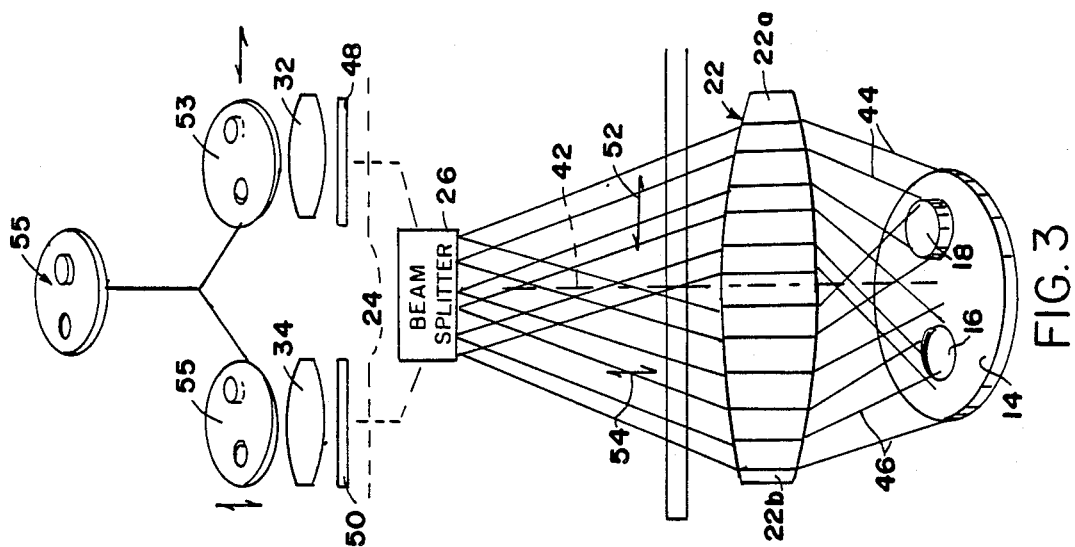
FIG. 3 illustrates the operation of the microscope of FIG. 1 in producing stereoscopic imaging of a subject.
Figure 1:
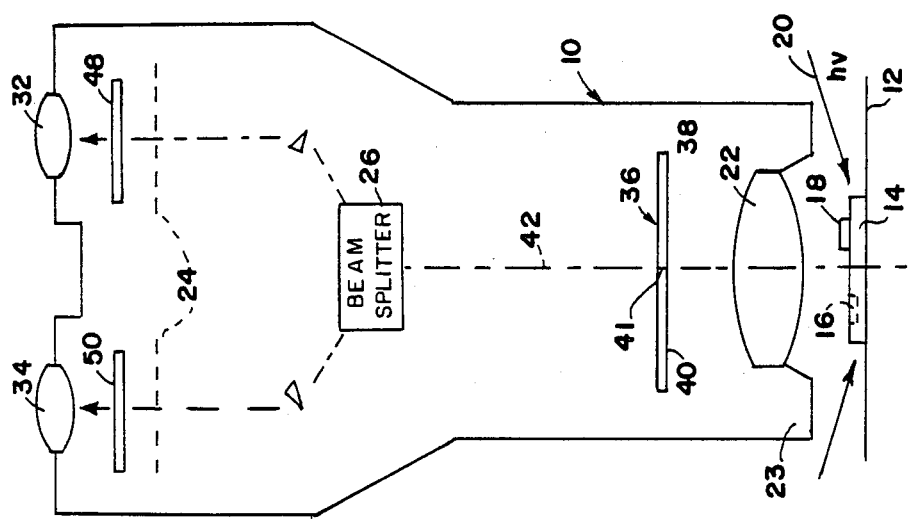
FIG. 1 is a partially schematic view of a stereomicroscope constructed according to the invention.

FIG. 1 illustrates, in partially schematic view, a stereomicroscope 10 constructed according to the present invention. The microscope includes a stage 12 for supporting a subject which is to be viewed under magnification. The particular subject shown, which is seen in enlarged perspective view in FIG. 3, is a disk 14 having a cylindrical hole 16 formed in the disk's left side, representative of a structure below the plane of focus (taken to be the upper surface of the disk), and a cylindrical pin 18 formed on the disk's right side, representative of a structure which is above the plane of focus. The stage on which the subject is supported may be illuminated from above by an overhead light source, indicated at 20 in the figure, or from below by a conventional collimated light source (not shown).

An objective lens 22 in the microscope is constructed to produce a magnified image of the subject at the focal plane of the lens, indicated here by dashed line 24. The objective lens, which is also referred to herein as an objective, is typically a compound lens, but is shown here for simplicity as a single lens. Light rays from the objective lens is directed through a beam splitter 26 which functions in a conventional manner to split and direct the image formed by the objective lens to right and left ocular lenses, or oculars, 32, 34 respectively, in the microscope. In a typical microscope, lens 22 is housed in a lens casing, such as indicated at 23, and the casing is carried on a rotatable mount which also carries additional lenses which can be operatively positioned for use by rotating the mount.

The two oculars are designed, according to conventional microscope construction, for viewing and further magnifying the magnified image produced by the objective lens. Like lens 22, the two oculars are typically compound lenses, but are shown here for simplicity as single lenses. The above-described components and construction of a compound microscope are entirely conventional. Further, without the additional filer components now to be described, the magnified image of disk 14 would appear to the viewer as a planar surface—that is, the hole and pin in the disk would be seen as circular structures on a larger planar circle, and it would not be apparent, except for shadows or lack of focal clarity within these structures, that they are out of the plane of the upper surface of the disk.

Figure 2:
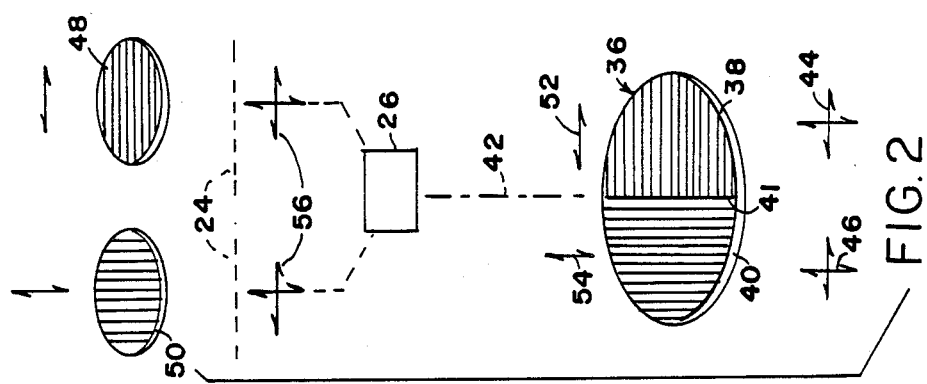
FIG. 2 shows, in perspective view, polarizing elements of the microscope of FIG. 1.

Considering now the novel features of the microscope of the invention, a filter device 36 is positioned adjacent the objective lens for dividing the image produced by the lens into left and right perspective components characterized by different polarization components. With reference to FIG. 2, device 36 includes a pair of side-by-side polarizing filters 38, 40 which are designed to polarize light in mutually orthogonal directions. The closely spaced lines in the filters indicate the direction of polarization of light. That is, filter 40 polarizes light rays from lens 22 in a front-to-back direction (normal to the direction of the FIG. 1 drawing plane) and filter 38 polarizes light rays in a side-to-side direction, i.e., a left-to-right direction in FIGS. 1 and 2. The two semicircular filters abut at a center line 41 which forms a diameter of the circular filter device. The directions of polarization of filters 40, 38 are respectively parallel and perpendicular to center line 41; however, the two polarization directions may assume any angular orientation with respect to the center line, with the limitation that the two directions are substantially orthogonal to one another. The construction of polarizing filters 38, 40 is conventional.

The filter device is positioned in the microscope so that the device's center line lies in a vertical plane, indicated by a dash-dot line at 42 in FIGS. 1–3, that divides the field of view of lens 22 into two equal halves. Specifically, the vertical plane divides both the lens and the filter device into two equal plane-symmetric halves. In the drawing and in the description of the invention to follow, the plane indicated by line 42 is the symmetry plane which divides the field of view of the lens into symmetrical right and left halves. However, it is understood that this vertical plane (and the coplanar line of abutment of filters 38, 40) may assume any angular orientation about a vertical axis which passes through the center of lens 22. For purposes of definition, therefore, the left and right perspective components produced by the filter device do not necessarily correspond to components as viewed by right and left halves of the lens, but may, for example, correspond to symmetrical front and back components viewed by front and back halves of the lens.

The functioning of the filter device can be understood from the lower portion of FIG. 3, which shows the subject disk in perspective view. A series of light rays, such as rays 44, which are directed upward and to the right indicate the view of disk from the perspective of the right half of the lens, indicated at 22a. Similarly, the rays, such as rays 46, directed upward and to the left indicate the view of the disk from the perspective of the left half of the disk, indicated at 24b. After passing through the objective lens, the rays which reach the right and left sides of the lens converge, to form, at the focal plane, the image of the subject. The purpose of the filter device is to polarize the rays which pass through the right half of lens 22 in one direction, and those that pass through the left half in the orthogonal direction. This can be accomplished by placing the filter either in front of or behind the objective lens, between the subject being viewed and the subject image formed by the objective, but in either case close enough to the lens so that each filter in the filter device is filtering predominantly rays seen by one half of the lens only. For example, it can be seen from the FIG. 3 that as filter device 36 is moved progressively closer to the upper surface of lens 22, that filter 38 is more selective for rays from lens half 22a, and filter 40 is more selective for rays from lens half 22b. Similarly, if the filter device were placed in front of the objective lens, the individual filters would become more selective for lens-half perspective rays, as the filter device is moved closer to the lower surface of the lens. In the usual compound objective lens, the filter device may be placed between lens elements at or near the pupil of the lens. The filters may also be formed on a lens surface. In another embodiment, a filter is carried in a cap (not shown) which is designed for detachable fastening to the lens casing.

The microscope further includes left and right polarizing filters 48, 50 placed adjacent the right and left oculars, respectively. As seen in the upper portion of FIG. 2, where the closely spaced lines in the filter indicate the direction of polarization, the polarization direction of filters 48, 50 are aligned with those of filters 38, 40, respectively, such that light rays polarized by filter 38 are passed through filter 48, but effectively blocked at filter 50, and light rays polarized by filter 38 are passed by filter 50, but effectively blocked at filter 48. The filters may be placed in front of their corresponding ocular lenses, as shown, or located in back of the lenses, between lens elements in compound ocular lenses, or formed on the lens or beam-splitter surfaces.

The polarization of light rays which occurs in the microscope is illustrated in FIG. 2. The figure shows light rays 44, 46 which are directed toward left and right halves of lens 22, respectively, as in FIG. 3. Both light rays are unpolarized, i.e., contain both orthogonal vector components, as shown. As light rays 44 pass through filter 38, which may be positioned either above or below lens 22, they are linearly polarized in a side-to-side direction, as illustrated at 52. Similarly, rays 46 are linearly polarized in a front-to-back direction by passage through filter 40, as indicated at 54 in the figure. The image formed by the objective lens thus may be thought of as consisting of two component images: one formed by the right half of the objective lens, which is linearly polarized in a side-to-side direction, and the other formed by the left half of the objective and polarized in a front-to-back direction. Again it is noted that "right" and "left" are used here only to denote opposite sides of the objective lens, and "front-to-back" and "side-to-side" polarization directions, only to denote mutually orthogonal polarization directions. The two image components are also referred to herein as left and right perspective components, since each represents an image of the subject from the perspective of either the right or the left half of the objective lens. The composite left and right perspective components formed by the objective lens are then resolved into their different linearly polarized components by passage through the polarizing filters 48, 50, as indicated.

Figure 7:
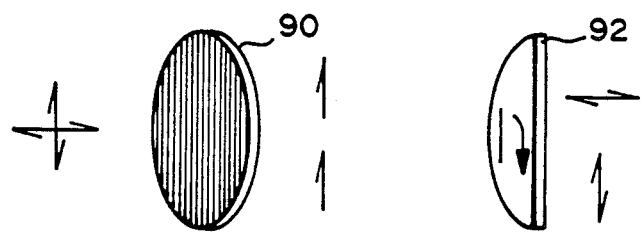
FIG. 7 is a view like FIG. 2, but showing polarizing elements in another embodiment of the microscope of the invention.

It will be appreciated that a variety of light source and filter configurations would function to divide the image produced by the objective lens into left and right perspective components characterized by different polarization directions. The entire image ray bundle could be polarized, for example, by using a suitable polarizing filter 90 (FIG. 7) for polarizing the light which reaches the objective. Here the filter device includes a half-wave retarder 92 covering one half of the objective lens. The retarder functions to rotate the plane of polarization of the light passing through that lens half to a direction orthogonal to the initial polarization direction, as indicated in FIG. 7.

FIG. 3 illustrates how the microscope operates to produce stereoscopic imaging of the subject disk. The series of light rays 44 which are directed toward the right half of the objective lens provide an image of the disk as viewed from the right in the figure, showing the right edge of the disk and features of the disk pin and hole that are visible from the right. This image is illustrated in perspective view at 53 in the top of the figure.

Similarly, rays 46, which are seen by the left half of the objective lens, provide an image of the disk as seen from the left, this image being seen at 55 in the figure. The separate images formed by rays 44, 46 are then polarized in different (mutually orthogonal) directions and are focused by the objective lens to form a composite single image at the focal plane of the lens. This composite image, which in fact is a combination of two perspective images which are polarized in different directions, is indicated at 56 in FIG. 2. This image, when viewed separately through the two oculars in the microscope, is separated into its individual polarized forms, so that the right eye of the viewer sees the right-perspective image 53, and the left eye sees the left-perspective image 55. These two visual images are then processed in the brain to produce the stereoscopic image seen at 55 in the figure.

Figure 4A:
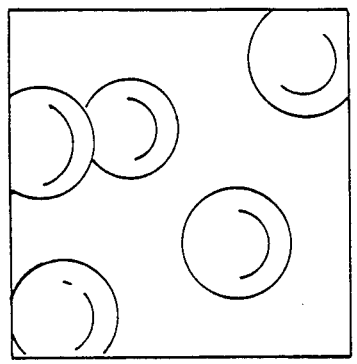
FIGS. 4A and 4B are graphic representations of magnified red blood cells as seen through a conventional binocular microscope (4A) and through the stereomicroscope of the present invention (4B)
Figure 4B:
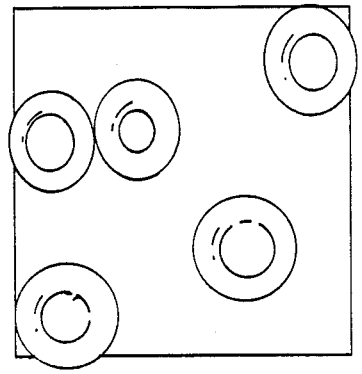

FIGS. 4A and 4B are graphic representations of magnified red blood cells as they appear by conventional binocular microscopy (4A), and by stereoscopic microscopy, according to the present invention. The cells in FIG. 4A have the general disk shape familiar to those in the art, wherein the surface concavity which is characteristic of red blood cells is not apparent, and is only evidenced by regions of somewhat blurred focus in the regions indicated by arcuate lines in the figure. By contrast, when viewed stereoscopically with the microscope of the invention, the depth features of the cells, and particularly the central concavities in the cells, are readily seen.

B. Single-Objective Stereoscopic Telescope

Figure 5:
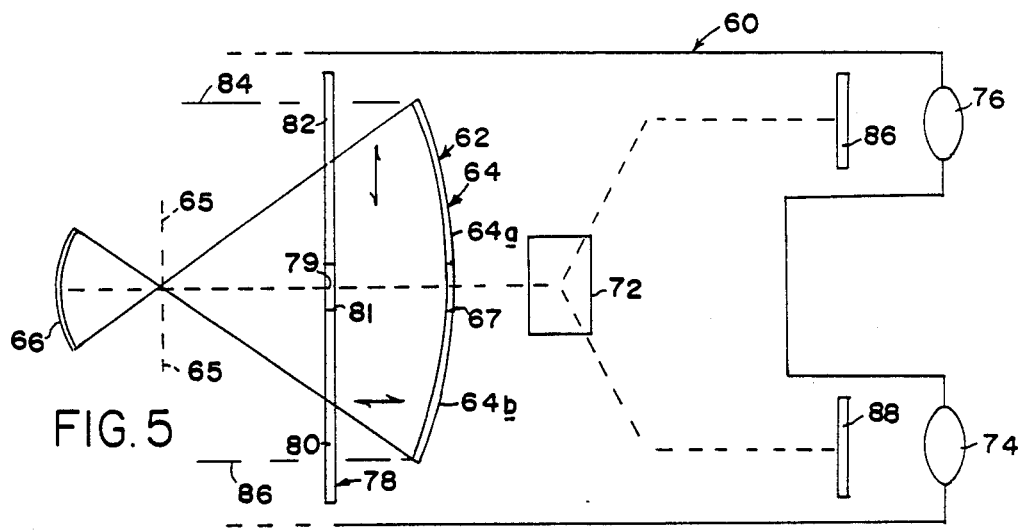
FIG. 5 is a partially schematic view of a single-objective, stereoscopic binocular telescope constructed according to the invention.

In another general embodiment, the invention includes a single-objective stereoscopic telescope 60, such as the one illustrated in schematic plan view in FIG. 5. The telescope has a two-mirror objective 62 composed of a relatively large-diameter aspheric primary mirror 64, whose focal plane is indicated at 65, and a relatively small-diameter secondary mirror 66, whose focal plane is just inside focal plane 65. The aspheric mirror may take the form of a complete conical surface, or a lateral strip portion thereof, as indicated by dotted lines at 68 in this figure. The mirror is constructed to "span" the distance between right and left eyepieces in the instrument, and has a preferred diameter of between about 4-8 inches.

According to conventional telescope constructions principles, light which is received from a distant subject is focused by mirror 64 onto mirror 66, and the image is reflected through a central opening 67 in mirror 64. The reflected image is split by a beam splitter, represented schematically at 72, into left and right beams, and these beams are directed through left and right ocular eyepieces, or oculars, 74, 76, respectively. The construction and arrangement of the components just described would be well known to one skilled in the art. Of course, it is recognized that conventional binocular telescopes are not constructed in this manner, since the stereoscopic imaging which is inherent in the usual binoculars having two separate lens systems would be lost with a conventional single-objective system. The advantage of the present invention is that the novel filter system, now to be described, produces stereoscopic imaging without the requirement for two separate lens systems.

Figure 6:
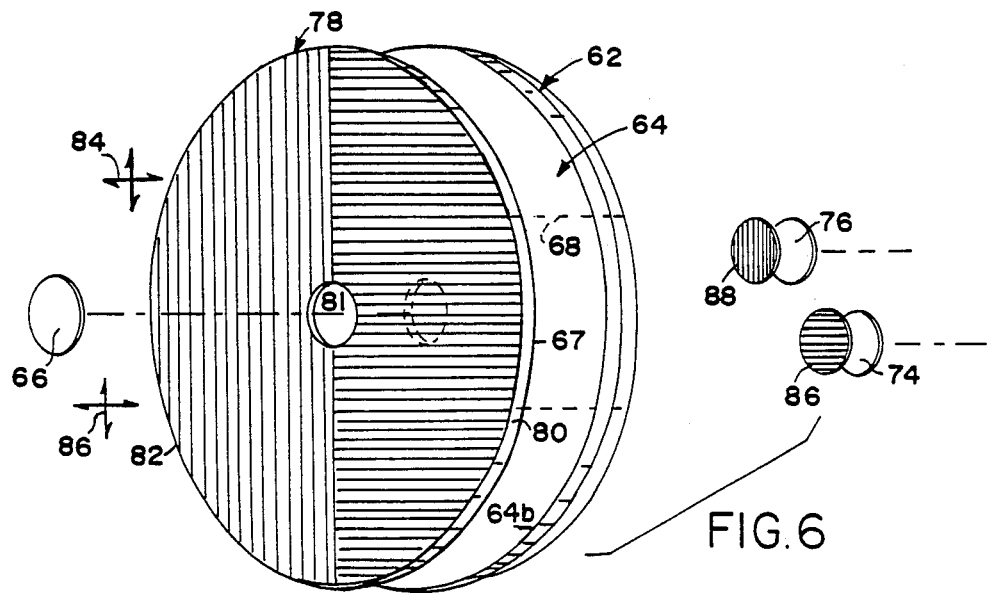
FIG. 6 shows, in perspective view, lens and filter components of the telescope of FIG. 5.

With continued reference to FIGS. 5 and 6, a filter device 78 placed adjacent the large-diameter mirror includes a pair of side-by-side polarizing filters 80, 82 whose polarizing directions, indicated by closely spaced lines, are mutually orthogonal. The vertical center line 79 between the two filters in FIG. 6 lies in a vertical plane which divides mirror 64 into equal right and left halves, indicated 64a and 64b, respectively. The filter device functions in a manner analogous to device 36, to divide the image produced by the objective lens into left and right perspective components characterized by different polarization directions. Specifically, the subject is viewed in the form of light rays 84 which impinge upon the right half of the mirror, and light rays 86 which impinge upon the left half of the mirror. These light rays are initially unpolarized, containing both vertical and side-to-side vector components, as indicated in FIG. 6. On passing through the filter in either direction (before and after reflection by mirror 64), rays 84, which form the right-perspective component of the image formed by the objective lens become polarized in the vertical direction, and rays 86, which form the left-perspective component of the image, become polarized in a side-to-side direction.

The filter device can be positioned either directly in front of both mirrors in the objective lens system (that is, to the left of the mirrors in the figures), or between the larger-diameter mirror in the objective lens, as illustrated. The first filter position takes advantage of the fact that light rays impinging on the objective lens are nearly parallel, and therefore both the filter and the larger-diameter mirror are seeing about the same angle of light rays. At this position, the filter device is dimensioned to cover or span the area of the larger-diameter mirror. In the second position, where the filter is placed between mirror 64 and its focal plane, the device is dimensioned to cover the area of the cone formed by the light rays from the mirror and the plane of focus, and is preferably relatively close to the mirror, so that the two perspective-image rays are filtered before they begin to interfere on approaching the focal plane. As shown, the device includes a central opening 81 aligned with opening 67.

The filter device or means just described functions generally to divide the image formed by the objective lens into left and right perspective images having different directions of polarization. It can be appreciated from the earlier description of microscope 10 that the specified functions can be achieved by other types of filter devices. In particular, the device could take the form of a single polarizing filter which linearly polarizes the entire field seen by the objective lens, and a half-wave retarder placed "behind" the polarizing filter for rotating the direction of polarization of that component of the image formed by either the left or right half of the objective lens.

The telescope further includes left and right polarizing filters 86, 88, respectively, located adjacent oculars 74, 76, respectively. As seen in FIG. 6, each filter has a grating whose polarizing direction, as indicated by the closely spaced lines, is identical to that of the corresponding filter in device 78. Typically, where the oculars are compound lenses, each filter is placed between the primary and secondary lens elements in the associated ocular, or may be formed as a grating on the lens surface.

The operation of the telescope in producing stereoscopic imaging of a distant subject substantially follows that of above-described microscope 10. Briefly, the subject is viewed from right and left sides of the objective lens, with the filter device acting to divide the image produced by the objective lens into left- and right-perspective components characterized by mutually orthogonal polarizing directions. The composite image is directed to the oculars, where filter 88 allows the right-perspective image component alone to be viewed through the right ocular, and filter 86 allows the left-perspective component alone to be viewed through the left ocular. The two images, when viewed simultaneously, produce a stereoscopic image of the subject being viewed.

From the foregoing, it can be appreciated how various objects and features of the invention are met. The stereoscopic microscope can be constructed by simple modification of a conventional high-power binocular microscope, requiring only placement of a polarizing filter device adjacent or interior to the objective lens, and insertion of polarizing filters in the ocular tubes. The filter device may be a slip-on attachment for fastening to the casing which holds the object lens, in which case the modification can be carried out readily by the microscope user.

The stereoscopic imaging produced by the microscope allows the user to visualize the three-dimensional features of a subject at high magnification. The relative positions of depth-related features can be easily identified, and the user experiences less visual and mental fatigue. The microscope produces stereoscopic imaging without appreciable compromise of image quality.

The stereoscopic telescope of the invention provides the important advantage over existing binocular telescopes that the telescope is much simpler and less expensive to produce. As noted above, conventional binoculars tyically have right and left compound objective lenses, each with primary and secondary lens elements, a constructions which requires four ground surface per lens. The single-objective telescope of the invention, by contrast, requires only a pair of reflectors, and these are much easier to produce with high tolerance than glass lenses. Further, the two prism systems used in conventional high-quality binocular telescopes are now replaced by a single beam-splitting prism system. The single-objective instrument can also be made much lighter than conventional binoculars.

While preferred embodiments of the invention have been described herein, it will be appreciated that various changes and modifications can be made without departing from the invention.

What is claimed is:

1. An optical system for producing stereoscopic imaging of a subject, comprising:
   an objective for producing an image of the subject,
   right and left ocular lenses for viewing the image through right and left eyes, respectively,
   a polarizing filter device positioned adjacent the objective, between the subject and the image formed by the objective, for dividing the image produced by the objective into left and right perspective components characterized by different polarization directions, and right and left polarizing filters positioned adjacent the right and left ocular lenses, respectively, allowing the right and left perspective components to be viewed exclusively through the right and left ocular lenses, respectively.

2. The system of claim 1, which is a microscope, and wherein the light from the subject directed onto the objective is polarized in one direction, and the filter device includes a half-wave optical retarder which acts on the right or left half of the image only, to produce left and right perspective components with mutually orthogonal polarized light.

3. The system of claim 1, which is a microscope wherein the objective is a compound lens composed of a primary and secondary lens, and the filter means is positioned between such elements.

4. The system of claim 1 which is a microscope, wherein the objective is housed in a lens casing and the filter device is detachably fastened to the casing.

5. The system of claim 1 which is a binocular telescope, wherein the objective includes a relatively large-diameter primary reflector which forms an image in front of the reflector and a relatively small-diameter secondary reflector constructed and positioned to reflect this image toward the two ocular lenses.

6. The system of claim 5, wherein the primary reflector substantially spans the side-to-side distance between the two ocular lenses, and has a diameter of between about 4–8 inches.

7. The system of claim 5, wherein the filter device is positioned between the two reflectors of the objective.

* * * * *